United States Patent [19]
Becker et al.

[11] Patent Number: 5,474,415
[45] Date of Patent: Dec. 12, 1995

[54] APPARATUS FOR THE EMPTYING OF CONTAINERS

[75] Inventors: Klaus Becker; Rüdiger Ostholt, both of Wetter, Germany

[73] Assignee: Mannesmann Aktiengesellschaft, Dusseldorf, Germany

[21] Appl. No.: 99,750

[22] Filed: Jul. 29, 1993

[30] Foreign Application Priority Data

Jul. 30, 1992 [DE] Germany ............... 42 25 491.4

[51] Int. Cl.$^6$ ............................................. B65G 47/46
[52] U.S. Cl. ................. 414/421; 198/465.1; 198/349
[58] Field of Search ............... 198/349, 350, 198/465.1, 365; 414/419, 421

[56] References Cited

U.S. PATENT DOCUMENTS

| | | | |
|---|---|---|---|
| 3,642,158 | 2/1972 | Koennecke et al. | 198/465.1 X |
| 4,413,721 | 11/1983 | Bollier | 198/365 |
| 4,635,785 | 1/1987 | Prydtz | 198/365 |
| 4,744,454 | 5/1988 | Polling | 198/365 |
| 5,253,745 | 10/1993 | van den Bergh et al. | 198/465.1 |
| 5,295,780 | 3/1994 | Tanaka | 414/421 |
| 5,301,790 | 4/1994 | Prydtz et al. | 198/349 |

FOREIGN PATENT DOCUMENTS

| | | | |
|---|---|---|---|
| 0077554 | 9/1985 | European Pat. Off. | |
| 1337328 | 9/1987 | U.S.S.R. | 198/465.1 |

Primary Examiner—Michael S. Huppert
Assistant Examiner—Stephen Gordon
Attorney, Agent, or Firm—Horst M. Kasper

[57] ABSTRACT

An apparatus for the emptying of containers is disposed in the course of a conveyor way for containers loaded with piece goods, in particular with luggage pieces. A branch conveyor for receiving discharged piece goods is following to the emptying apparatus. The emptying apparatus is furnished with support rollers and guide elements for the containers and a tipping device with a swivel drive for the swiveling of the containers perpendicular to the transport advance direction (F) of the conveyor way in direction toward the branch conveyor. In order to obtain an emptying of the container during the transport motion based on a constructively simple structure of the apparatus, the container (3) is essentially constructed to comprise a part (4), formed by a shell-shaped floor (8) for receiving the piece goods (5) and a lower part (6). The lower part (6) includes essentially a planar support face (10) and a member for the transfer of the drive forces of the drive rollers (13) and of the tipping forces of the guide elements (15, 115) to the planar support face (10).

22 Claims, 5 Drawing Sheets

APPARATUS FOR THE EMPTYING OF CONTAINERS

BACKGROUND OF THE INVENTION

1. Field of the Invention

The present invention relates to an apparatus for the emptying of containers, which emptying apparatus is disposed in the course of a conveyor way for the containers loaded with piece goods, in particular, luggage pieces, and which emptying apparatus is connected to a branch conveyor for the receiving of the unloaded luggage pieces, and which emptying apparatus further includes support rollers and guide elements for the containers, and a tipping device with a swivel drive for the swiveling of the containers in a direction perpendicular to the advance direction of the conveyor way and in a direction toward the branch conveyor.

2. Brief Description of the Background of the Invention Including Prior Art

A device for the emptying of containers loaded with piece goods or parcels is known from the European Patent Document EP 0 077 554 B1, where the apparatus is disposed in the course of a conveyor way, preferably formed as a roller conveying station. Thus, the conveyor way is subdivided in a feed transport apparatus ahead of the emptying device and into an empties conveyor following and adjoining behind the emptying apparatus. Adjoining to the emptying apparatus and perpendicular to the conveyor way there is disposed a belt conveyor in the emptying direction for the further transport of the piece goods emptied from the container. The emptying apparatus comprises essentially a tipping device, where the tipping device tips the containers by about 45° in a direction perpendicular to an advance direction of the conveyor way and in the direction of the belt conveyor at the emptying location, and a stroke device with a piston. This piston can be inserted and is movable from below through slot-shaped breakouts in the floor plane of the container, whereby the piece goods are lifted above and over the edge of the tipped container such that they slide down onto the belt conveyor in emptying direction. In an inclined position, the container is supported in the region of its side wall by rollers disposed at the emptying apparatus. A sliding off of the container in the emptying direction is thereby prevented. After completing the emptying, the tipping device swivels again into the horizontal position and the empty container is transported in a direction of the following empties conveyor.

This emptying apparatus has proven to be associated with disadvantages, since a plurality of break-outs have to be provided in the container floor in order to allow the insertion of the piston driven by a stroke device during the discharge process. The disposition of the slots weakens, on the one hand, the container floor and leads, on the other hand to higher production costs of the container. In addition, this emptying apparatus is only suitable to empty containers while resting on the device in a rest position. Therefore, the throughput of the conveyor way depends on the speed with which the containers are discharged.

SUMMARY OF THE INVENTION

Purposes of the Invention

It is an object of the present invention to provide a device for the emptying of containers, which is characterized by a simple construction and which simultaneously allows an emptying of the containers during a transporting motion.

It is a further object of the invention to provide a transport device including an emptying of containers which allows automatic operation and sorting of transported piece goods.

It is yet a further object of the invention to provide an individual and reliable transfer of luggage from a conveyor way onto a conveyor belt disposed at an angle relative to the conveyor way.

It is yet another object of the present invention to simplify and to increase reliability of emptying and discharging of piece goods.

These and other objects and advantages of the present invention will become evident from the description which follows.

Brief Description of the Invention

According to the present invention there is provided for an apparatus for an emptying of containers. An upper part of a container is formed by a shell-shaped formed floor for receiving piece goods. A lower part of the container is formed by a planar support face, and by a means for transferring drive forces to the planar support face. The upper part of the container and the lower part of the container form the container. The container includes support rollers. The means for transferring drive forces transfers drive forces of the support rollers to the planar support face. The container further includes guide elements. The means for transferring drive forces transfers tipping forces of the guide elements to the planar support face. A tipping device is connected to a swivel drive for swiveling the container in a direction perpendicular to a transport advance direction.

A first conveyor can be disposed neighboring the support rollers and guide elements on an input side for feeding the container loaded with a unit of piece goods to the support rollers and guide elements. A branch conveyor can adjoin the support rollers and guide elements for receiving a discharged unit of piece goods from the container. A second conveyor can be disposed neighboring the support rollers and guide elements on a discharge side for discharging the now emptied container from the support rollers and guide elements onto the second conveyor. The shell-shaped floor of the container can exhibit a wall section having a shape of an imaginary hollow cylinder. A longitudinal axis of the hollow cylinder can be directed in a direction running from the first conveyor to the second conveyor. A front side wall of the container and a rear side wall of the container can be attached to the shell-shaped floor of the container and thereby close the container on a front side and on a rear side with the respective side wall.

A drive channel can be furnished in the planar support face, running in a direction from the first conveyor toward the second conveyor and constructed for being driven by running on the support rollers.

A first side channel can be disposed parallel to the drive channel near a first side edge on the planar support face. A second side channel can be disposed parallel to the drive channel near a second side edge on the planar support face and on a side opposite to the first side edge.

The first channel, the drive channel, and the second channel can in each case have a depth, which depth can be selected such that the shell-shaped floor can rest on outer convex sides of the first channel, the drive channel, and the second channel. The shell-shaped floor can be attached at the outer convex sides of the first channel, the drive channel, and the second channel.

A first connector strip can be disposed between an upper side of the first channel and a lower side of the floor. A second connector strip can be disposed between the upper side of the second channel and the lower side of the floor. A third connector strip can be disposed between the upper side of the drive channel and the lower side of the floor. The first connector strip, the second connector strip, and the third connector strip can be produced out of a vibration-absorbing material.

The support rollers, which engage into the drive channel, can be disposed in series and at a distance from each other as seen in the transport advance direction. The support rollers can be rotated around horizontal axes disposed perpendicular to the transport advance direction, and can otherwise be spatially fixedly disposed relative to a frame of the emptying apparatus.

The upper part of the container and the lower part of the container can be made of a plastic material.

The tipping device for the container can be formed by a first two-arm lever. This first two-arm lever can be swivelable around a swivel axle, running in the transport advance direction of the container. The swivel axle can be disposed between two of the support rollers. In each case the guide elements for guiding lateral ends of the support face can be disposed at two ends of the levers.

The guide elements can be formed as pairs of guide rollers and slide rail pieces disposed on top of each other. The guide rollers and the slide rail pieces can in each case form a slot for guiding the lateral ends of the support face.

A running face of the support rollers can be formed having a circular cross-section. A support provided by the drive channel to the container can be supplemented, as seen in case of a horizontally positioned container, complementarily with the adjoining running face of the support rollers. A then following lateral region of the drive channel can extend forming a shallower channel angle.

A center point of the swivel axle can be located at a level with a center of curvature of the running face of the support roller cut at a highest point perpendicular to the transport advance direction.

A second two-arm lever can be disposed in series in the transport advance direction relative to the first two-arm lever. A distance between the first two-arm lever and the neighboring second two-arm lever and between one of the first two-arm lever and the second two-arm lever and a thereto neighboring conveyor, respectively, can be smaller than a length of the container.

An information carrier for storing data of the piece goods can be disposed between the floor and the lower part of the container as well as centered in the container, when seen in the transport advance direction.

In accordance with the invention, the apparatus for the emptying of containers achieves advantageously a transfer of piece goods such that a requirement of providing an additional stroke device with a piston for the emptying of the container can be dispensed with based on the separation of the container into an upper part for the receiving of the piece goods, and into a lower part for the transfer of the drive forces and of the tipping forces, as well as based on the shell-shaped structure of the upper part of the container. It is an advantage of the structure of the upper part of the container as a wall section of an imaginary hollow cylinder, where the ends of the hollow cylinders, as seen in the direction of the advance of the conveyor, are in each case closed on the front side and on the rear side with a respective side wall, that the piece goods can be easily tipped and slid off because no side wall is present in the direction of transfer to the branch conveyor. Furthermore, a sliding of the piece goods in the advance direction of the conveyor way can be successfully prevented based on the presence of the side walls, which sliding could be caused by the occurring start accelerations or, respectively, the negative acceleration induced by a brake. The structural arrangement of a drive channel, running in the direction of the conveyor, in the otherwise planar support face of the lower part of the container allows that the container is transported on a sequence of support rollers. Said support rollers are disposed in series and one behind the other and at a distance from each other in the region of the emptying apparatus in the conveyor advance direction as seen in FIG. 2. The planar regions of the support face allow to transport the container also on conventional roller conveyors or, respectively, belt band conveyors. The special arrangement of the support rollers in connection with the drive channel creates in a particularly and constructively simple structure of the tipping device based on a two-arm lever. Said two-arm lever can be swiveled around a swivel axis, running parallel to the conveyor advance direction, and guide rollers for the container are in each case disposed at the ends of the two-arm lever. The guide elements are in particular provided as pairs of superpositioned rollers and slide rails, wherein two guide elements, one roller and one slide rail in each case form a slot. The guide elements assure that the container is still guided safely, while the container is moving on the support rollers or while the container is tipped around the support rollers. The special adaptation of the profiles of the drive channel and of the running faces of the support rollers allows a low-wear operation of the emptying apparatus. The disposition of several two-armed levers of the tipping device sequentially behind each other, as seen in the drive direction of the conveyor, results in an emptying apparatus, which allows an emptying of the containers during the drive motion by adapting to the conveyor speed of the conveyor way, wherein the distance of sequentially following two-armed levers from each other or between the armed levers and next following conveyor way is smaller than the length of the container. It has proven to be particularly advantageous to provide connector strips made of a vibration-absorbing material and/or vibration isolating material such as, for example, rubber, which is disposed between the lower part and the upper part of the container, because this allows successfully to avoid a conducting of structure-borne noise and body sound. Furthermore, these connector strips can balance out and compensate for possible production tolerances between the upper part and the lower part of the container. The use of plastic, in particular, of GFK or glass fiber-reinforced plastic, results in a light-weight construction of the container and thus in a low inert mass which allows an economic construction of the swivel drive. Such glass-fiber reinforced plastic materials are being defined for example, in the German Industrial Standard 772HT2 of Nov. 19, 1986. The fibers increase the mechanical strength and stability and possibly the thermal stability of the material. Saturated polyester materials, resins and thermoplastic resins made of the polyamide, the polystyrene, the polycarbonate and the polyolefine type are particularly suited as plastic materials. Furthermore, it has been shown as advantageous to dispose an information carrier between the upper part and lower part of the container and above the drive channel, because this location is well protected from outside interferences and forces. The disposition of this information carrier centrally in the middle of the container allows an employment of a container which is independent of the transport direction.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

Figure 1:
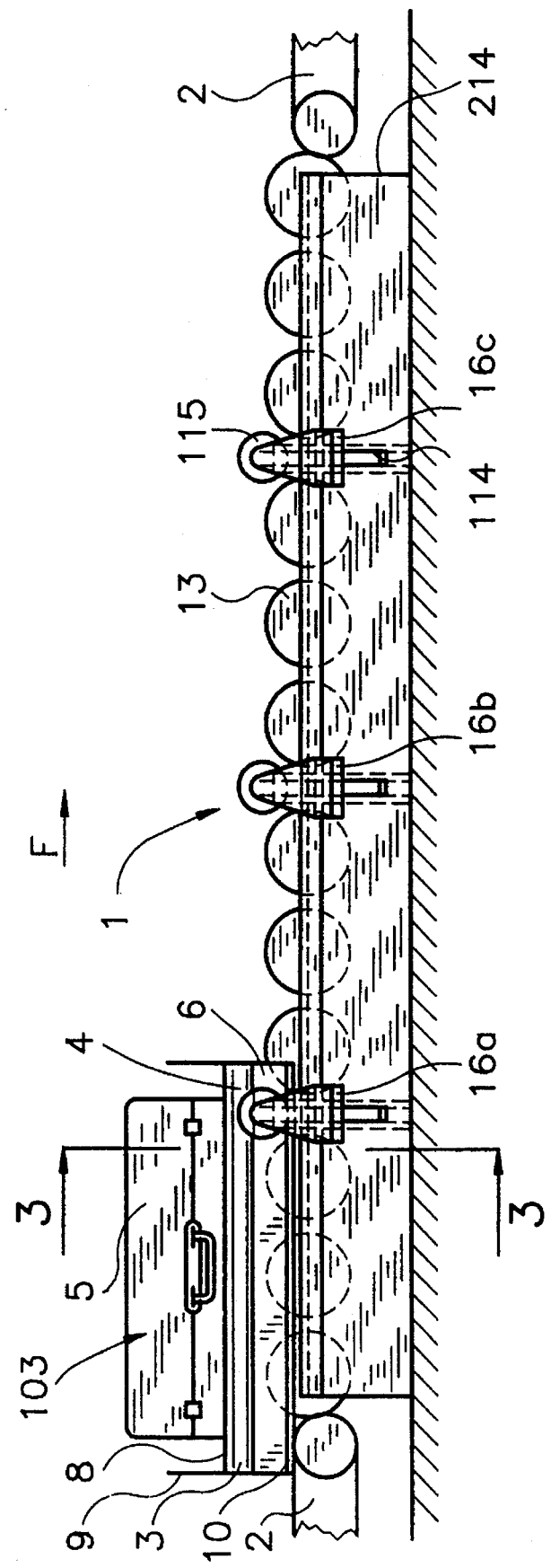
FIG. 1 is a side elevational view of an invention device for the emptying of containers disposed on the course of a belt conveyor.

According to the present invention, there is provided an apparatus for the emptying of containers. The emptying apparatus is disposed on a piece goods unloading section in a course of a conveyor way for containers loaded with piece goods, in particular luggage pieces. A branch conveyor for receiving discharged piece goods follows to the emptying apparatus. The emptying apparatus is furnished with support rollers and guide elements for the containers and with a tipping device with a swivel drive for swiveling the containers in a direction perpendicular to a transport advance direction of the conveyor way toward the branch conveyor. The container 3 includes an upper part 4, formed essentially by a shell-shaped formed floor 8, for receiving the piece goods 5, and a lower part 6. The lower part 6 is formed essentially by a planar support face 10 and by means for transferring drive forces of the support rollers 13 and tipping forces of the guide elements 15, 115 to the planar support face 10.

The floor 8 of the container 3 can exhibit a shape of a wall section of an imaginary hollow cylinder. The longitudinal axis of the hollow cylinder can be directed in the transport advance direction F. The floor 8 of the container 10 can in each case be closed on a front side and on a rear side with a side wall 9. A drive channel 12, running in the transport advance direction F, can be constructed for the support rollers 13 in the planar support face 10 of the container 3. A further channel 11 can in each case be disposed parallel to the drive channel 12 and on each side of the drive channel 12 on the support face 10. The channels 11 and the drive channel 12 can in each case have a depth. Said depth can be selected such that the shell-shaped floor 8 rests on outer sides of the channels 11 and of the drive channel 12. The floor 8 can be attached at the outer sides of the channels 11, 12. In each case a connector strip 23 can be disposed between an upper side of the channels 11 and of the drive channel 12 and of a lower side of the floor 8. The connector strip 23 can be produced out of a vibration-absorbing material.

The upper part 4 and the lower part 6 of the container 3 can be made of plastic material. A running face of the support rollers 13 can be formed like a circular section. The drive channel 12 can be supplemented, as seen in case of a horizontal container 3, complementarily with the adjoining running face of support rollers 13. A then radially following region of the drive channel 12 can broaden.

The support rollers 13, which engage into the drive channel 12, can be disposed in series and at a distance from each other as seen in the transport advance direction F. The support rollers 13 can be rotated around horizontal axes disposed perpendicular to the transport advance direction F, and can otherwise be spatially fixedly disposed relative to a frame 214 of the emptying apparatus.

The tipping device for the container 3 can be formed by a two-arm lever 16. Said two-arm lever 16 can be swiveled around a swivel axle 17 having an axis 117 and running in the transport advance direction F. The swivel axle 17 can be disposed between two support rollers 13. In each case the guide elements 15, 115 for lateral ends of the support face 10 can be disposed at two ends of the levers 16. The guide elements 15, 115 can be formed as pairs of guide rollers 115 and slide rail pieces 15 disposed on top of each other. The guide rollers 115 and the slide rail pieces 15 in each case form a slot 18 for guiding the lateral ends of the support face 10. The center point of the swivel axle 17 can be located at a level with a center of curvature of the running face of the support roller 13 cut at the highest point perpendicular to the transport advance direction F. A plurality of levers 16 can be disposed in series in the transport advance direction F. The distance between the neighboring levers 16 and between the levers 16 and then adjoining conveyor belts, respectively, can be smaller than one length of the container 3. An information carrier 22 for storing data of the piece goods 5 can be disposed between the floor 8 and the lower part 6 of the container 3 as well as in the center of the container 3, seen in transport advance direction F and emptying direction.

FIG. 1 shows a side elevational view of the invention apparatus for the emptying of containers. The emptying apparatus 1 is disposed in the course of a conveyor way 2 with a conveyor advance direction F, which conveyor way is formed in this case as a belt conveyor. The conveyor way 2 serves for the feeding and, respectively, discharge of the containers 3 to or, respectively, from the emptying apparatus 1. The container 3 is constructed to perform the function of being carried on a straight conveyor belt 2, of being transported on a section supporting and driving the container 3 with rollers 13 and of being tipped by a tipping lever 16 disposed in the area of the positioned rollers 13 for discharging luggage pieces or piece goods 5. As shown in FIG. 1 there is a conveyor belt 2 on the left side bringing on the container 3, a middle section with rollers 13 and levers 16 for tipping and then again a conveyor belt 2.

The container 3 comprises substantially an upper part 4 for the receiving of luggage pieces or piece goods 5, 103 and a lower part 6 connected to the upper part 4 for the transfer of the drive and tipping forces, where FIG. 1 shows a view of a container resting on the horizontal conveyor way. The upper part 4 is constructed to be of such a size that a piece of luggage 103, such as for example a suitcase, can be placed onto the upper part 4.

Figure 3:
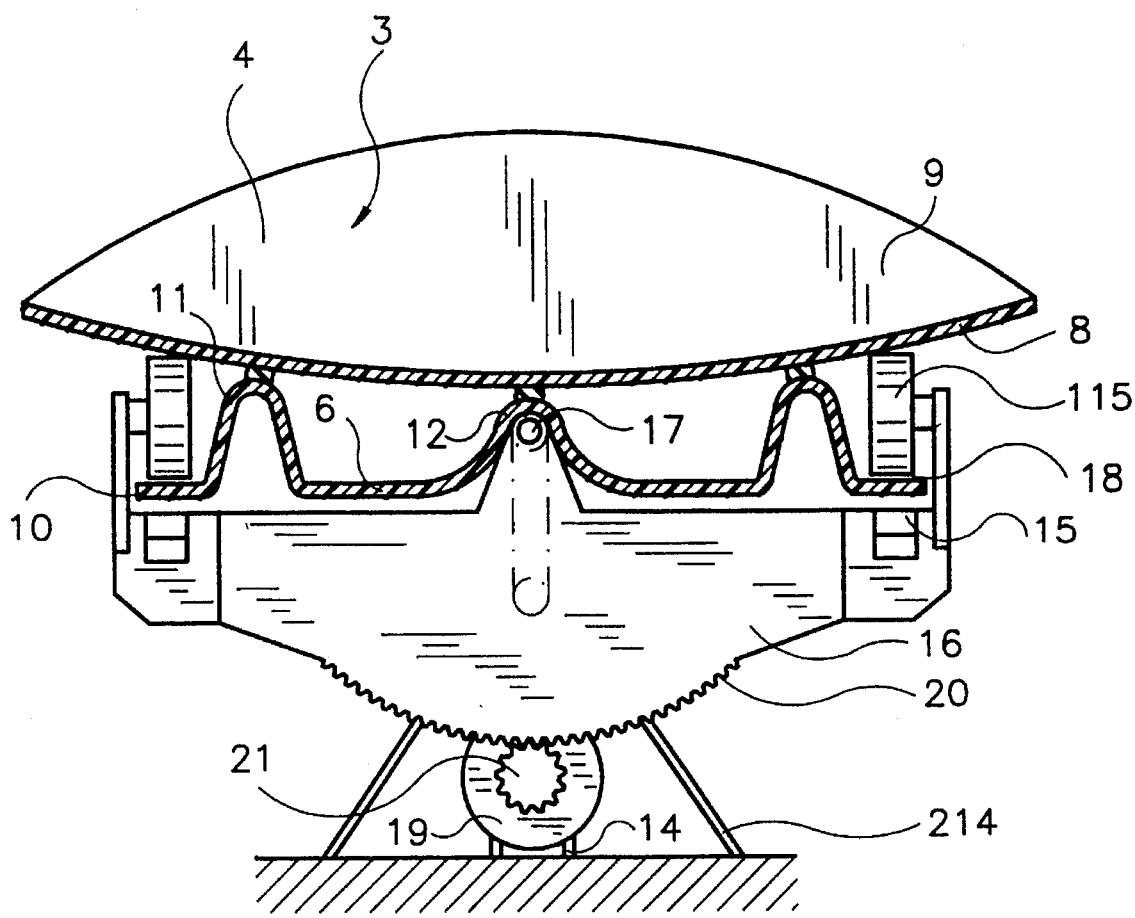
FIG. 3 is an enlarged sectional view of the embodiment of FIG. 1 according to the section line 1—1.

This construction of the container can be gathered from FIG. 3 which shows a sectional view along section line 1—1 of FIG. 1, where, however, the container 3, is unloaded. The upper part 4, which serves for the receiving of the luggage pieces or piece goods 5, exhibits a floor 8. The floor 8 is curved such that the floor 8 rises in each case starting from the middle of the container 3 in a direction perpendicular to the conveyor advance direction F. The concavely curved floor 8 is delimited by two side walls 9, adapted to the curvature of the floor 8, at a front side and a rear side as seen from above in conveyor advance direction F. The container 3 thus exhibits no side walls disposed parallel to the transport advance direction F. The lower part 6 of the container 3, which serves for the transfer of the drive and tipping forces, comprises essentially a planar support face 10. The planar support face 10 is subdivided into four regions by three channels 11, 12 running parallel to the transport advance direction F. The drive channel 12 is disposed in the middle of the container 3 and serves as a rail for the support rollers 13. The two outer channels 11 have the purpose to render the containers 3 stiffer and they can also be used as guide channels for straight-line guiding strips disposed possibly in the course of the emptying apparatus 1 or of the conveyor path 2. In addition, the floor 8 is attached on the upwardly curved outer sides of the channels 11, 12. The support rollers 13 placed in the channel 12 are in each case rotatable around a horizontal axis and supported at a support element 114, where the support element 114 is in turn supported at a mounting floor or a support floor. Frame elements 214 are employed to support slidingly or frictionless the lever 16 and the rollers 13. FIG. 3 shows support elements 114 for supporting the lever 16 and for guiding the tipping motion of the lever 16. The two lateral ends of the support faces 10 of the lower part 6 serve for the guiding of the container 3. The guiding is performed with guide elements 15, 115, which are formed by pairs of slide rail pieces 15 and by guide rollers 115. The slide rail pieces 15 can also be provided by rollers. The guide rollers 115 are rotatable around horizontal axes relative to a middle rest position of the emptying apparatus 1. The guide rollers 115 are in each case disposed above the slide rail pieces 15 under formation of a slot 18. The lateral ends of the support faces 10 of the containers 3 are guided in this slot 18 depending on the tipping state either from above by the guide rollers 115 or from below by slide rail pieces 15. The guide elements 15, 115 in each case are supported at the ends of two-arm lever 16, 16a, 16b, 16c. The two-arm lever 16 is a general two-arm lever which can assume any position, the two-arm lever 16a is the two-arm lever on the left hand side of FIG. 1 receiving the container 3 from the left conveyor belt 2, the two-arm lever 16b is the two-arm lever in the middle of FIG. 1, and the two-arm lever 16c is the two-arm lever on the right hand side of FIG. 1 transferring and delivering the container 3 to the receiving conveyor belt 2 on the right hand side of FIG. 1. The ends of the two-arm lever 16 are disposed in a horizontal plane while the emptying apparatus 1 is in a rest position. Furthermore, the lever 16 can be tilted by a swivel drive 19 around a swivel axis 17 directed parallel to the transport advance direction F. The position of the center point of the swivel axis 17 coincides substantially with the center point of curvature of the running face of a support roller 13, cut at the highest position perpendicular to the transport advance direction F. The swivel drive 19 is preferably formed as a servomotor. The servomotor is aligned with its rotation axis parallel to the swivel axis 17 and is attached at a support element 14. A gear wheel 21 is connected to the servomotor and slid onto the rotation axis of the swivel drive 19 and attached. The gear wheel 21 engages a gear crown 20. The gear crown 20 is disposed on the side of the lever 16 facing away from the swivel axis 17. The center point of curvature of the elements of the gear crown 20 coincides with the center point of the swivel axis 17.

Figure 4:
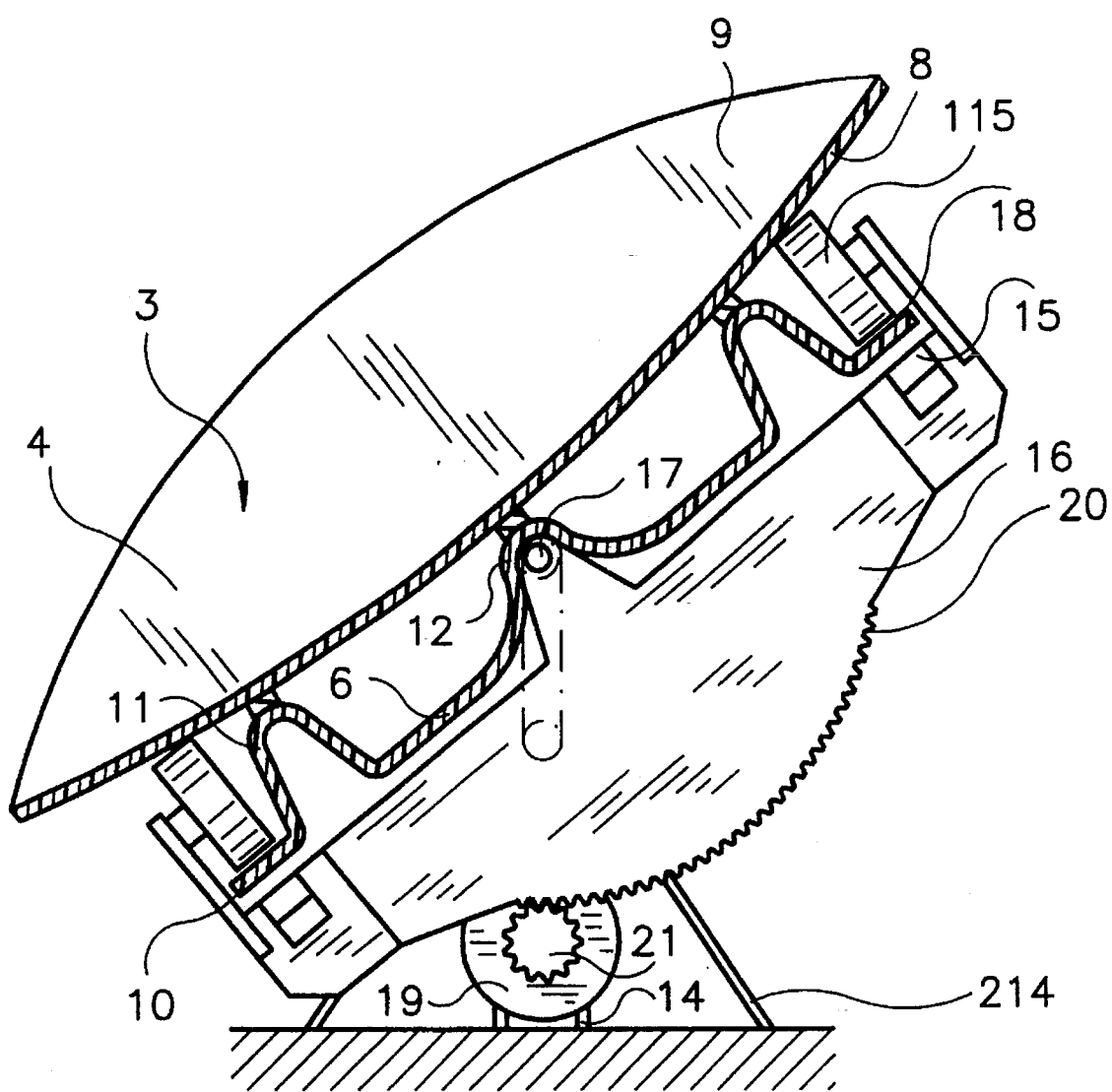
FIG. 4 is a sectional view of the emptying apparatus according to FIG. 3 in a tipped position.

FIG. 4 shows the emptying apparatus 1 according to FIG. 3 in a position tipped by about 40° relative to the position shown in FIG. 3. It can be recognized that, based on the tip motion of the container 3, the guide face in the channel 12 for the support roller 13 is slightly displaced and staggered relative to the swivel direction. This displacement and staggering is kept at a minimum by the coordination of the radius of curvature of the running face of the support roller 13, of the radius of curvature of the channel 12, and of the placement of the center point of the swivel axis 17. The radius of curvature of the channel 12 coincides in the crest area with the radius of curvature of the running face of the support rollers 13. However, the radius of curvature then is expanded on two sides in direction of the support rollers 13 in order to allow a swiveling of the container 3 around the support roller 13 without brushing the sides of the support roller 13.

Figure 5:
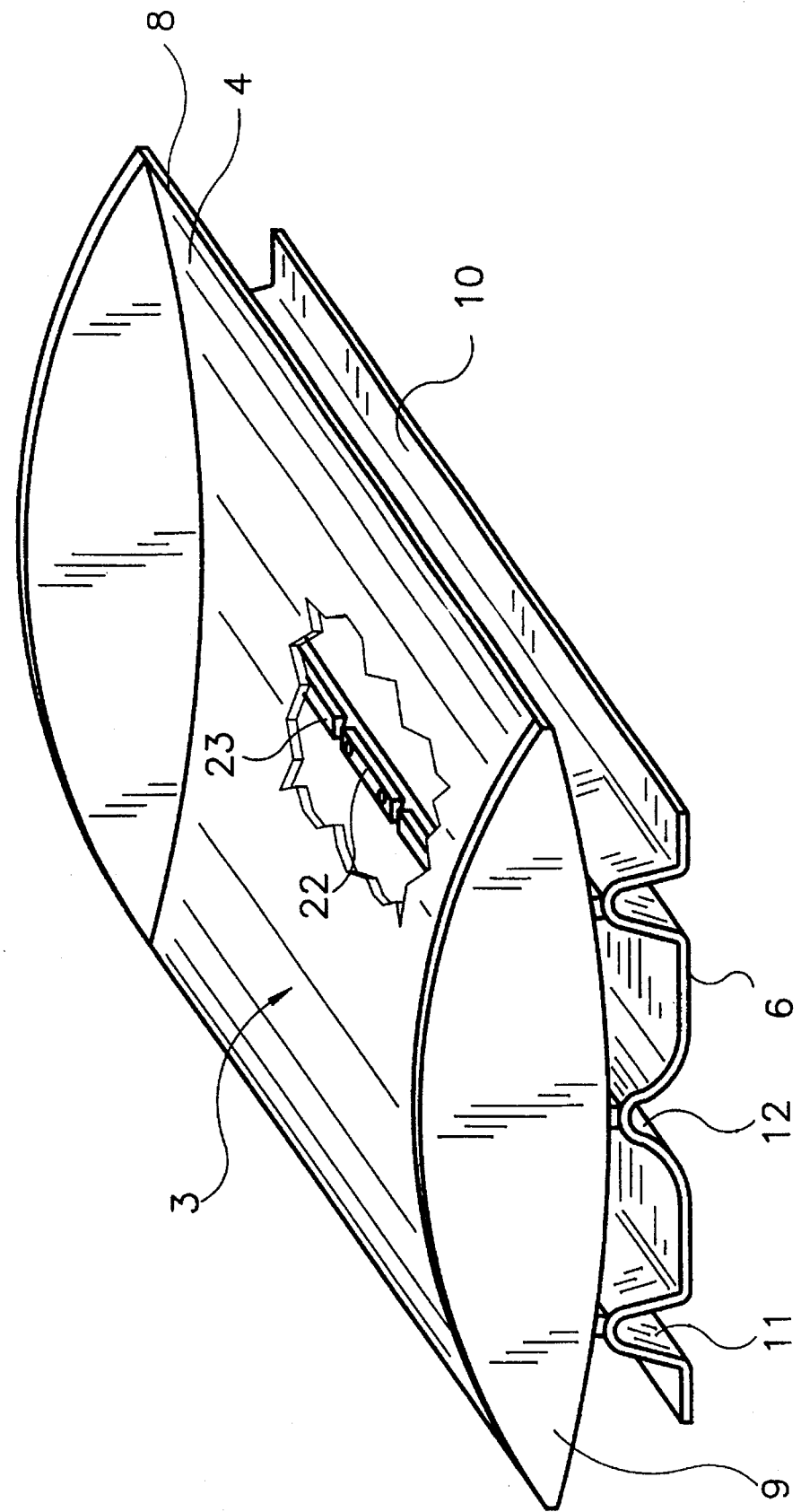
FIG. 5 is a perspective view of a container of an emptying apparatus according to the present invention.

A perspective view of the container 3 is shown in FIG. 5. The container 3 exhibits no side walls in a direction perpendicular to the transport advance direction F, i.e. in the direction of emptying, because the piece goods 5 can be safely transported based on the bulging, the convex shape, the outwardly rising form and side curvature of the floor 8 of the container 3. Furthermore, the four-fold subdivided support face 10, provided by the channels 11, 12 disposed in the transport advance direction F, can be clearly recognized. In addition, there can be recognized the rail-shaped formation of the outwardly directed support faces 10, which serve for the guiding of the container 3 and for the transmission of the tipping forces to the container 3.

Furthermore, the floor 8 of the container 3 is furnished with a breakout in the representation shown in the drawing of FIG. 5 in order to be able to illustrate the information carrier 22 disposed below the floor of the container 3. The information carrier 22 is disposed above the channel 12 and is aligned in the longitudinal direction of the channel 12. The information carrier 22 is preferably provided as a chip, which stores information about the material and piece goods to be transported. Furthermore, it can be recognized that the upper part 4 of the container 3 is connected with connector strips 23, to the lower part 6, where the connector strips 23 are produced from rubber. The connector strips 23 run above and parallel to the channels 11, 12. Only the connector strip 23 on the channel 12 is interrupted in the center in order to provide a support and mounting place for the information carrier 22.

Figure 2:
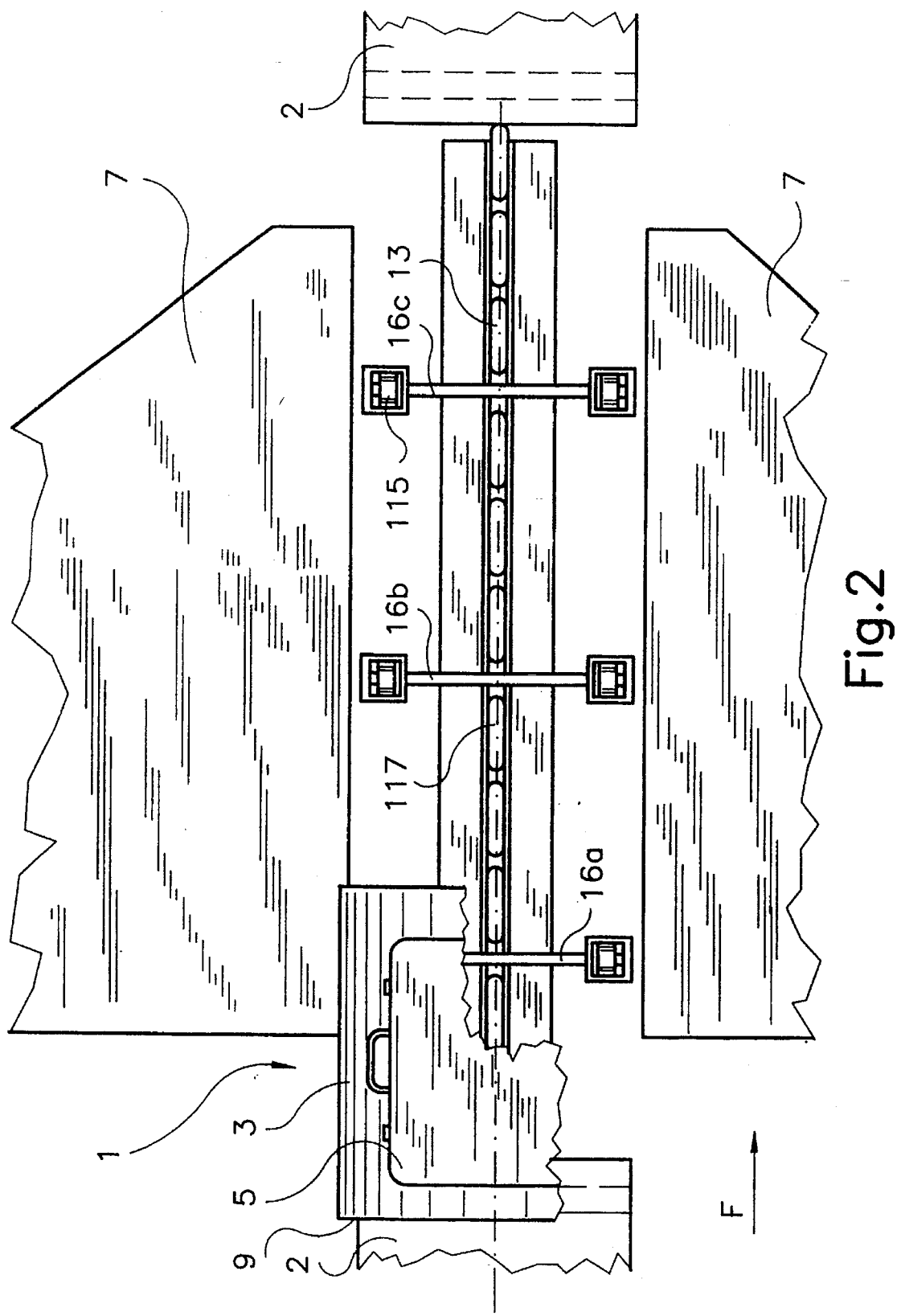
FIG. 2 is a top plan view of the embodiment of FIG. 1.

In the following, the mode of operation of the invention device for the emptying of containers is described by way of the illustrations of FIGS. 1 through 5. A container 3, loaded with luggage pieces or piece goods 5, 103, in particular with a suitcase, is transported on a conveyor way formed in particular as a conveyor belt 2 from the left side of FIG. 1, in the direction of the emptying apparatus 1. The container 3 is supported and braced during the transport on the conveyor belt 2 by its four-fold subdivided planar support face 10. This formation of the support face 10 allows also a transport of the container 3 on roller support ways such as provided by the rollers 13. If the containers 3 are now to be emptied at a particular location, then the conveyor way 2 can be interrupted and an emptying apparatus 1 according to the present invention can be furnished at that location to receive the containers 3 from the conveyor belt 2 shown on the left hand side of FIG. 1. A container 3, approaching the emptying apparatus 1, on the conveyor belt 2, passes a read/write unit disposed below the conveyor belt 2 on the left hand side of FIG. 1 and immediately in front of the emptying apparatus 1. This read/write unit inductively evaluates the information carrier 22 disposed at the container 3, where the information carrier 22 contains the data relative to the luggage pieces and piece goods 5 transported at that time, and delivers and transmits to the emptying apparatus 1 the information whether the container 3 has to be emptied or not. In the following, the container 3 leaves the conveyor belt 2 and moves with its central channel 12 onto the spatially fixed support rollers 13, which are disposed sequentially in series in transport advance direction F and at a distance relative to each other. The radius of curvature of the running face of the support roller 13 and the structure and shape of the channels 12, are matched to each other. The container 3 now runs with the outer region of the support face 10 into the slot 18 between the slide rail pieces 15 and the guide rollers 115. At this point in time, the container 3 has not yet left the conveyor belt 2 in order to assure a safe insertion into the guide elements 15, 115 of the two-arm lever 16a. In the following, the container 3 leaves the conveyor belt 2 and, when an emptying of the container 3 is desired, can be selectively tipped towards the right side or towards the left side of FIG. 3 as seen in the drive advance direction F in order to discharge and deliver the piece goods 5 to a following branch way 7, as illustrated in FIG. 2. The branch way path 7 is disposed perpendicular or at an angle relative to the transport advance direction F and below the level of the conveyor belt 2. The tipping process of the container 3 is made possible by a swiveling of the lever 16 around an angle of up to about 45°, or preferably both two armed levers 16a, 16b around an angle of about 45°. The tipping motion of the lever 16a, which is performed by the swivel drive 19, effects that the container 3 is swiveled around the support rollers 13 by the guide elements 15 disposed at the ends of the levers 16. Two further levers 16b, 16c follow as seen in the transport advance direction F, where the two further levers 16b, 16c have a distance relative to each other which is in each case smaller than the length of the container 3. Two respective, in-series disposed levers 16a, 16b supporting and guiding a container 3 swivel synchronously with each other such that the container 3, still in engagement with the first lever 16a, can be inserted without problem into the guide element 15, 115 of a subsequent lever 16b reached next when the container 3 advances in direction F. At the point in time where the container 3 leaves the guide elements 15, 115 of the first lever 16a, then this first lever 16a swivels immediately back into the horizontal rest position in order to be able to receive a then following container 3. If the third lever 16c receives the container 3 at an angle position of 45°, then after the transfer of the container 3 into the guide element 15 of the third two-arm lever 16c, the third two-arm lever 16c swivels also back into the horizontal position in order to transport and deliver the container 3 to the then following horizontal conveyor belt 2 in a standard position.

The necessary tipping motion for the emptying is distributed onto three levers 16a, 16b, 16c. However, it is also possible in the exemplified embodiment in adaptation to the conveyor speed of the conveyor belt 2 to perform the emptying process also with only one single lever 16b accompanied by a decrease of the transport speed or to obtain a faster emptying speed with a plurality of levers such as 16a and 16b.

The diameter of the rollers 115 is preferably from about one to two times the diameter of the rollers associated with the conveyor belts 2. The diameter of the support rollers 13 is preferably from about 1.5 to three times the diameter of the rollers 115.

The floor 8 preferably has a curvature such that the curvature of the floor 8 from one side edge to the opposing side edge corresponds to an angle of from about 15 to 40 degrees and preferably to an angle of from about 20 to 30 degrees. The drive channel 12 exhibits preferably a lower depth as compared to the channels 11 in view of the curvature of the floor 8. Preferably, the lower part 6 is constructed such that it will not contact the rollers 115 and the slide rail piece 15 when the lever 16 is in a horizontal position and the floor 8 will rest on the rollers 115 and the channel 12 will rest on the support rollers 13. The length of the container can correspond to from about 1.1 to 2 times the distance between neighboring levers 16 and preferably amounts to from about 1.2 to 1.5 times the distance between neighboring levers 16. The width of the floor 8 is preferably from about 1.1 to 1.3 times the length of the two-arm lever 16. The length of the container is preferably from about 1.2 to 1.5 times the width of the container.

It will be understood that each of the elements described above, or two or more together, may also find a useful application in other types of emptying apparatus and of conveyor equipment differing from the types described above.

While the invention has been illustrated and described as embodied in the context of an apparatus for the emptying of containers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A combination piece goods container and piece goods container emptying apparatus, comprising
    a container including
    a shell-shaped floor having a lower side, furnishing an upper part of the container and for receiving piece goods,
    a planar support face furnishing a lower part of the container, having an upper side and attached at the upper side directly to the lower side of the shell-shaped floor,
    support means for transferring drive forces to the planar support face; and
    a conveyor way having a piece goods including section for handling said container when loaded with piece goods, including
    a swivel drive,
    a tipping device connected to the swivel drive for swiveling the container in a direction perpendicular to a transport advance direction,
    support rollers attached to the conveyor way for supporting and driving the container when the container is disposed on the piece goods unloading section,
    and guide elements attached to the tipping device for guiding the container when the container is disposed on the piece goods unloading section.

2. The apparatus according to claim 1, further comprising
    a first conveyor neighboring the support rollers and the guide elements on an input side of the conveyor way for feeding said container when loaded with a unit of piece goods, to the support rollers and the guide elements;
    a branch conveyor adjoining the support rollers and the guide elements for receiving a discharged unit of piece goods from the container;

a second conveyor neighboring the support rollers and the guide elements on a discharge side of the conveyor way for discharging said container, when emptied, from the support rollers and the guide elements;

wherein the shell-shaped floor of the container exhibits a wall section having a shape of an imaginary hollow cylinder, wherein a longitudinal axis of the hollow cylinder is directed in a direction running from the first conveyor to the second conveyor, and wherein a front side wall of the container and a rear side wall of the container are attached to the shell-shaped floor of the container and thereby close the container on a front side and on a rear side.

3. The apparatus according to claim 2, wherein said support means for transferring drive forces to the planar support face is comprised of a drive channel furnished in the planar support face, running in a direction from the first conveyor toward the second conveyor and constructed for being driven by running on the support rollers.

4. A combination piece goods container and piece goods container emptying apparatus, comprising an upper part of a container including a shell-shaped formed floor for receiving piece goods, a lower part of the container, wherein the lower part includes a planar support face directly attached to the shell shaped floor., and support means disposed at the planar support face for transferring drive forces to the planar support face;

a conveyor way having a piece goods unloading section for handling said container when loaded with piece goods, including a swivel drive;

a tipping device connected to the swivel drive for swiveling the container in a direction perpendicular to a transport advance direction;

support rollers for the container mounted to the conveyor way, wherein the support means for transferring drive forces transfers drive forces of the support rollers to the planar support face;

guide elements for the container mounted to the tipping device, wherein the support means for transferring drive forces transfers tipping forces of the guide elements to the planar support face;

a first conveyor neighboring the support rollers and guide elements on an input side of the conveyor way for feeding said container, when loaded with a unit of piece goods, to the support rollers and guide elements;

a branch conveyor adjoining the support rollers and guide elements for receiving a discharged unit of piece goods from the container;

a second conveyor neighboring the support rollers and guide elements on a discharge side of the conveyor way for discharging said container, when emptied, from the support rollers and guide elements;

wherein the shell-shaped floor of the container exhibits a wall section having a shape of an imaginary hollow cylinder, wherein a longitudinal axis of the hollow cylinder is directed in a direction running from the first conveyor to the second conveyor, and wherein a front side wall of the container and a rear side wall of the container are attached to the shell-shaped floor of the container and thereby close the container on a front side and on a rear side;

wherein said support means comprises a drive channel furnished in the planar support face and constructed for being driven by running on the support rollers;

a first side channel in said planar support face and disposed parallel to the drive channel near a first side edge on the planar support face;

a second side channel in said planar support face and disposed parallel to the drive channel near a second side edge on the planar support face and disposed on a side opposite to the first side edge.

5. The apparatus according to claim 4, wherein the first channel, the drive channel, and the second channel have in each case a depth, wherein each said depth is selected such that the shell-shaped floor rests on outer convex sides of the first channel, the drive channel, and the second channel, and wherein the shell-shaped floor is attached at the outer convex sides of the first channel, the drive channel, and the second channel.

6. The apparatus according to claim 5, wherein the container further comprises a first connector strip disposed between an upper side of the first channel and a lower side of the floor, a second connector strip disposed between the upper side of the second channel and the lower side of the floor;

a third connector strip disposed between the upper side of the drive channel and the lower side of the floor, and wherein the first connector strip, the second connector strip, and the third connector strip are produced out of a vibration-absorbing material.

7. The apparatus according to claim 4, wherein the support rollers are engaged into the drive channel and are disposed in series and at a distance from each other as seen in the transport advance direction, and wherein the support rollers are rotatable around horizontal axes disposed perpendicular to the transport advance direction, and are otherwise spatially fixedly disposed relative to a frame of the emptying apparatus.

8. The apparatus according to claim 1, wherein the upper part of the container and the lower part of the container are made of a plastic material.

9. The apparatus according to claim 4, wherein the tipping device for the container is formed by a first two-arm lever, which first two-arm lever is swivelable around a swivel axle, running in the transport advance direction of the container, wherein the swivel axle is disposed between two of the support rollers, wherein in each case the guide elements guide lateral ends of the planar support face and are disposed at two ends of the first two-arm lever.

10. The apparatus according to claim 9, wherein the guide elements are formed as pairs of guide rollers and slide rail pieces disposed on top of each other, wherein the guide rollers and the slide rail pieces in each case form a slot for guiding the lateral ends of the support face.

11. The apparatus according to claim 9, wherein a running face of each of the support rollers is rounded, and wherein a cross-section of the drive channel of the container exhibits a curvature which substantially matches the shape of the curvature of the rounded running faces of the support rollers, and wherein a then following lateral region of the drive channel decreases in curvature thereby forming a shallower outer channel angle.

12. The apparatus according to claim 11, wherein a center point of the swivel axle is located in a common plane with a center of the curvature of each rounded running face of the support rollers.

13. The apparatus according to claim 9, wherein the tipping device further comprises a second two-arm lever connected to said swivel drive and disposed in series in the transport advance direction relative to the first two-arm lever.

14. The apparatus according to claim 13, wherein a distance between the first two-arm lever and the second two-arm lever and between one of the first two-arm lever and the second two-arm lever and one of said first and second conveyors, respectively, is smaller than a length of the container.

15. The apparatus according to claim 14, further comprising an information carrier for storing data of the piece goods and disposed between the floor and the lower part of the container as well as centered relative to the container, when seen in the transport advance direction.

16. A combination piece goods container and piece goods container emptying apparatus, comprising a conveyor way for handling said container when loaded with piece goods, in particular luggage pieces, said conveyor way including support rollers, guide elements for containers, a tipping device supporting the guide elements, and a swivel drive engaging the tipping device;

a container (3) including an upper part (4), formed essentially by a shell-shaped floor (8), for receiving the piece goods (5), and a lower part (6), where the lower part (6) is formed essentially by a planar support face (10) directly attached to the floor;

wherein the container may be swiveled by the tipping device in a direction perpendicular to a transport advance direction of the conveyor way;

support means furnished at the lower part for transferring drive forces delivered by the support rollers (13) and tipping forces exerted by the guide elements (15, 115) to the planar support face (10); and a branch conveyor disposed adjacent said conveyor way for receiving piece goods discharged from the conveyor way.

17. The apparatus according to claim 16, wherein the floor (8) of the container (3) exhibits a shape of a wall section of an imaginary hollow cylinder, wherein the longitudinal axis of the hollow cylinder is directed in the transport advance direction (F), and wherein the floor (8) of the container (3) is closed on a front side and on a rear side with a side wall (9);

and wherein a drive channel (12) is disposed on the planar support face (10) of the container (3), running in the transport advance direction (F), and is constructed for engaging the support rollers (13);

wherein outer channels (11) are disposed in said planar support face, parallel to the drive channel (12), and on each side of the drive channel (12) on the support face (10);

wherein the outer channels (11) and the drive channel (12) have in each case a depth, wherein each said depth is selected such that the shell-shaped floor (8) rests on outer sides of the outer channels (11) and of the drive channel (12), and wherein the floor (8) is attached at the outer sides of the channels (11, 12);

wherein in each case a connector strip (23) is disposed between an upper side of the outer channels (11) and of the drive channel (12) and a lower side of the floor (8), and wherein the connector strip (23) is produced out of a vibration-absorbing material.

18. The apparatus according to claim 16, wherein the upper part (4) and the lower part (6) of the container (3) are made of plastic material;

wherein a running face of each of the support rollers (13) is rounded, and wherein a curvature of the drive channel (12) substantially matches the shape of the curvature of the rounded running faces of the support rollers, and wherein a then following lateral region of the drive channel decreases in curvature thereby forming a shallower outer channel angle.

19. The apparatus according to claim 16, wherein the floor (8) of the container (3) exhibits a shape of a wall section of an imaginary hollow cylinder, wherein the longitudinal axis of the hollow cylinder is directed in the transport advance direction (F), and wherein the floor (8) of the container (3) is closed on a front side and on a rear side with a side wall (9);

wherein a drive channel (12) is disposed in the planar support face (10), running in the transport advance direction (F), and is constructed for engaging the support rollers (13) (3);

and wherein a further channel (11) is disposed in said planar support face, parallel to the drive channel (12), and on each side of the drive channel (12) on the planar support face (10);

wherein the support rollers (13) engage into the drive channel (12) and are disposed in series and at a distance from each other as seen in the transport advance direction (F), and wherein the support rollers (13) are rotatable around horizontal axes disposed perpendicular to the transport advance direction (F), and are otherwise spatially fixedly disposed relative to a frame of the conveyor way.

20. The apparatus according to claim 16, wherein the tipping device is formed by a two-arm lever (16), which two-arm lever (16) is swivelable around a swivel axle (17), running in the transport advance direction (F), wherein the swivel axle (17) is disposed between two of said support rollers (13), wherein the guide elements (15, 115) are disposed at two ends of the two-arm lever (16);

wherein the guide elements (15, 115) are formed as pairs of guide rollers (115) and slide rail pieces (15) disposed on top of each other, wherein the guide rollers (115) and the slide rail pieces (15) form a slot (18) for guiding lateral ends of the planar support face (10);

wherein a center point of the swivel axle (17) is located in a common plane with a center of curvature of a running face of each of the support rollers;

wherein further levers (16) are connected to the swivel drive and disposed in series in the transport advance direction (F);

wherein the distance between neighboring levers (16) of said levers is smaller than a length of the container (3);

wherein an information carrier (22) for storing data of the piece goods (5) is disposed between the floor (8) and the lower part (6) of the container (3).

21. The apparatus according to claim 16, wherein said tipping device comprises a plurality of levers (16)

connected to said swivel drive and disposed in series in the transport advance direction (F);

wherein the distance between the neighboring ones of said levers (16) is smaller than one length of the container (3);

wherein an information carrier (22) for storing data of the piece goods (5) is disposed between the floor (8) and the lower part (6) of the container (3) as well as in the center of the container (3) as seen in the transport advance direction (F).

22. An apparatus for an emptying of containers in combination with a container comprising:

a container formed by a shell-shaped floor for receiving piece goods and by a planar support face attached directly to the floor and having a drive channel running in a transport advance direction, wherein the shell-shaped floor establishes an upper part of the container and the planar support face establishes a lower part of the container; and an emptying apparatus disposed on a piece goods unloading section in a course conveyor way having support rollers for supporting and driving the container wherein the support rollers engage into the drive channel of the planar support face when the container is on the piece goods unloading section, a tipping device connected to the conveyor way between a pair of said support rollers and comprising a swivel drive for swiveling the container in a direction perpendicular to the transport advance direction, and guide elements for guiding the container when the container is in the piece goods unloading section and attached to the tipping device wherein the guide elements may be swiveled with said tipping device to follow the position of the container when emptied.

\* \* \* \* \*